United States Patent
Okamura

(10) Patent No.: US 10,425,614 B2
(45) Date of Patent: Sep. 24, 2019

(54) MOVING IMAGE REPRODUCTION APPARATUS HAVING FUNCTION OF CORRECTING CAMERA SHAKE DURING MOVING IMAGE REPRODUCTION, METHOD OF CONTROLLING THE SAME, AND STORAGE MEDIUM

(71) Applicant: CANON KABUSHIKI KAISHA, Tokyo (JP)

(72) Inventor: Satoshi Okamura, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/949,169

(22) Filed: Apr. 10, 2018

(65) Prior Publication Data

US 2018/0302589 A1  Oct. 18, 2018

(30) Foreign Application Priority Data

Apr. 14, 2017 (JP) ................................. 2017-080708

(51) Int. Cl.
| | |
|---|---|
| *H04N 5/911* | (2006.01) |
| *H04N 5/232* | (2006.01) |
| *H04N 5/77* | (2006.01) |
| *H04N 9/82* | (2006.01) |

(52) U.S. Cl.
CPC ......... *H04N 5/911* (2013.01); *H04N 5/23254* (2013.01); *H04N 5/23267* (2013.01); *H04N 5/772* (2013.01); *H04N 9/8205* (2013.01)

(58) Field of Classification Search
CPC .... H04N 5/911; H04N 5/23254; H04N 5/772; H04N 5/23267
See application file for complete search history.

(56) References Cited

U.S. PATENT DOCUMENTS

| | | | | |
|---|---|---|---|---|
| 2007/0115364 A1* | 5/2007 | Kumaki | ............. | H04N 5/23248 348/208.99 |
| 2008/0136931 A1* | 6/2008 | Hatanaka | ................. | G03B 7/02 348/222.1 |

FOREIGN PATENT DOCUMENTS

| | | |
|---|---|---|
| JP | H07143380 A | 6/1995 |
| JP | H1042233 A | 2/1998 |
| JP | 2012044418 A | 3/2012 |

* cited by examiner

*Primary Examiner* — Thai Q Tran
*Assistant Examiner* — Jose M Mesa
(74) *Attorney, Agent, or Firm* — Rossi, Kimms & McDowell LLP

(57) ABSTRACT

A moving image reproduction apparatus that reproduces and displays captured moving image on a display device. An MPU acquires a shake amount, and determines whether the shake amount exceeds a range within which camera shake in the captured moving image can be corrected. When the shake amount exceeds the range, the MPU calculates an interpolated shake amount based on the shake amount such that the interpolated shake amount is within the range. The MPU decides a camera shake correction amount based on the shake amount and the interpolated shake amount. The MPU corrects camera shake using the camera shake correction amount. When the shake amount does not exceed the range, the MPU decides the shake amount as the camera shake correction amount, whereas when the shake amount exceeds the range, the MPU decides the interpolated shake amount as the camera shake correction amount.

7 Claims, 7 Drawing Sheets

FIG. 5A

| n | Bcur(n) | Bnxt(n) |
|---|---|---|
| 1 | 10 | - |
| 2 | 20 | - |
| 3 | 15 | - |
| 4 | 30 | - |
| 5 | 10 | - |
| 6 | 20 | - |
| 7 | 40 | - |
| 8 | 60 | - |
| 9 | 80 | - |
| 10 | 120 | 80 |
| 11 | 200 | 84 |
| 12 | 400 | 92 |
| 13 | 600 | 100 |
| 14 | 450 | 97 |
| 15 | 300 | 94 |
| 16 | 150 | 91 |
| 17 | 90 | - |
| 18 | 70 | - |
| 19 | 40 | - |
| 20 | 30 | - |
| 21 | 15 | - |
| 22 | 20 | - |
| 23 | 10 | - |
| 24 | 15 | - |
| 25 | 10 | - |
| 26 | 20 | - |

MOVING IMAGE REPRODUCTION APPARATUS HAVING FUNCTION OF CORRECTING CAMERA SHAKE DURING MOVING IMAGE REPRODUCTION, METHOD OF CONTROLLING THE SAME, AND STORAGE MEDIUM

BACKGROUND OF THE INVENTION

Field of the Invention

The present invention relates to a moving image reproduction apparatus, a method of controlling the same, and a storage medium.

Description of the Related Art

Due to recent demand for size reduction, a digital video camera, a digital still camera, and so forth are reduced in space for disposing a sensor circuit board on which an image pickup device is mounted, and a main circuit board on which electronic components for processing control signals and image signals are mounted, and are also reduced in distance between the circuit boards. Further, due to advances in board packaging technology, packaging density of electronic components mounted on the circuit boards has also increased.

When video is shot by an image pickup apparatus, such as a digital video camera, camera shake is sometimes included in the stored video due to shake (vibration), such as hand shake, of the image pickup apparatus. To overcome this problem, there have been proposed various techniques for correcting camera shake in video when the stored video is reproduced. For example, a technique is proposed in which a motion vector indicative of camera shake in video is detected, and a partial video area is selected according to the detected motion vector, for enlarged display of the selected partial video area (see Japanese Laid-Open Patent Publication (Kokai) No. H07-143380). Further, a technique is proposed in which shake of an image pickup apparatus is detected by a sensor during shooting, and data of the detected shake is stored together with video data so as to correct camera shake in the video using the shake data during reproduction of the video (see Japanese Laid-Open Patent Publication (Kokai) No. H10-42233). Furthermore, a technique is proposed in which the display magnification of enlarged display for camera shake correction is determined, based on the magnitude of a shake amount of the shake data, at the time of video reproduction (see Japanese Laid-Open Patent Publication (Kokai) No. 2012-44418).

In the above-described conventional techniques, however, a sudden (momentary) large camera shake caused by instantaneous impact applied directly or indirectly to the image pickup apparatus during video shooting is also stored as shake data together with video data. If the video data is subjected to camera shake correction during reproduction of the same, camera shake correction processing is performed also on the sudden large camera shake, and hence, the enlargement ratio of the reproduced video is increased in accordance with execution of the camera shake correction processing, which results in degradation of image quality. Further, in a case where the shake amount is large, an angle of view of the reproduced video largely changes from the angle of view at the time of shooting the video.

To solve this problem, if an upper limit is set for the enlargement ratio of the reproduced video so as to prevent a large change in the angle of view and the camera shake correction is only allowed to function in the case of occurrence of camera shake which is not so large as will make the enlargement ratio of the reproduced video for the camera shake correction larger than the upper limit, the shake blur is not conspicuous to a viewer of the reproduced video. However, if camera shake occurs which makes the enlargement ratio of the reproduced image larger than the upper limit, the camera shake cannot be corrected, and hence a sudden shake blur occurs in the reproduced video, causing the viewer to feel a strangeness.

SUMMARY OF THE INVENTION

The present invention provides a moving image reproduction apparatus that is capable of reproducing captured moving image which makes it difficult for a viewer to feel a strangeness, even when a sudden camera shake occurred during moving image shooting, by performing camera shake correction during captured moving image reproduction such that the angle of view is not made largely different from that at the time of moving image shooting.

In a first aspect of the present invention, there is provided a moving image reproduction apparatus that reproduces and displays captured moving image on a display device, comprising at least one processor that executes a program stored in a memory to function as an acquisition unit configured to acquire a shake amount associated with the captured moving image, a determination unit configured to determine whether or not the shake amount exceeds a range within which camera shake in the captured moving image can be corrected, a calculation unit configured to, in a case where the shake amount exceeds the range, calculate an interpolated shake amount based on the shake amount such that the interpolated shake amount is within the range, a decision unit configured to decide a camera shake correction amount for correcting the camera shake in the captured moving image based on the shake amount and the interpolated shake amount, and a correction unit configured to correct the camera shake in the captured moving image using the camera shake correction amount, wherein in a case where the shake amount does not exceed the range, the decision unit decides the shake amount as the camera shake correction amount, whereas in the case where the shake amount exceeds the range, the decision unit decides the interpolated shake amount as the camera shake correction amount.

In a second aspect of the present invention, there is provided a method of controlling a moving image reproduction apparatus that reproduces and displays captured moving image on a display device, comprising acquiring a shake amount associated with the captured moving image, determining whether or not the shake amount exceeds a range within which camera shake in the captured moving image can be corrected, calculating, in a case where the shake amount exceeds the range, an interpolated shake amount based on the shake amount such that the interpolated shake amount is within the captured moving image, deciding a camera shake correction amount for correcting the camera shake in the captured moving image based on the shake amount and the interpolated shake amount, and correcting the camera shake in the captured moving image using the camera shake correction amount, wherein said deciding includes deciding, in a case where the shake amount does not exceed the range, the shake amount as the camera shake correction amount, and deciding, in the case where the shake amount exceeds the range, the interpolated shake amount as the camera shake correction amount.

In a third aspect of the present invention, there is provided a non-transitory computer-readable storage medium storing a computer-executable program for executing a method of controlling a moving image reproduction apparatus that reproduces and displays captured moving image on a display device, wherein the method comprises acquiring a shake amount associated with the captured moving image, determining whether or not the shake amount exceeds a range within which camera shake in the captured moving image can be corrected, calculating, in a case where the shake amount exceeds the range, an interpolated shake amount based on the shake amount such that the interpolated shake amount is within the range, deciding a camera shake correction amount for correcting the camera shake in the captured moving image based on the shake amount and the interpolated shake amount, and correcting the camera shake in the captured moving image using the camera shake correction amount, wherein said deciding includes deciding, in a case where the shake amount does not exceed the range, the shake amount as the camera shake correction amount, and deciding, in the case where the shake amount exceeds the range, the interpolated shake amount as the camera shake correction amount.

According to the present invention, it is possible to reproduce captured moving image which makes it difficult for a viewer to feel a strangeness, even when a sudden camera shake occurred during moving image shooting, by performing camera shake correction during captured moving image reproduction such that the angle of view is not made largely different from that at the time of moving image shooting.

Further features of the present invention will become apparent from the following description of exemplary embodiments (with reference to the attached drawings).

BRIEF DESCRIPTION OF THE DRAWINGS

FIG. 5A is a diagram showing a table indicating a relationship between the reference shake amount and the interpolated shake amount.

DESCRIPTION OF THE EMBODIMENTS

The present invention will now be described in detail below with reference to the accompanying drawings showing embodiments thereof.

Figure 1:
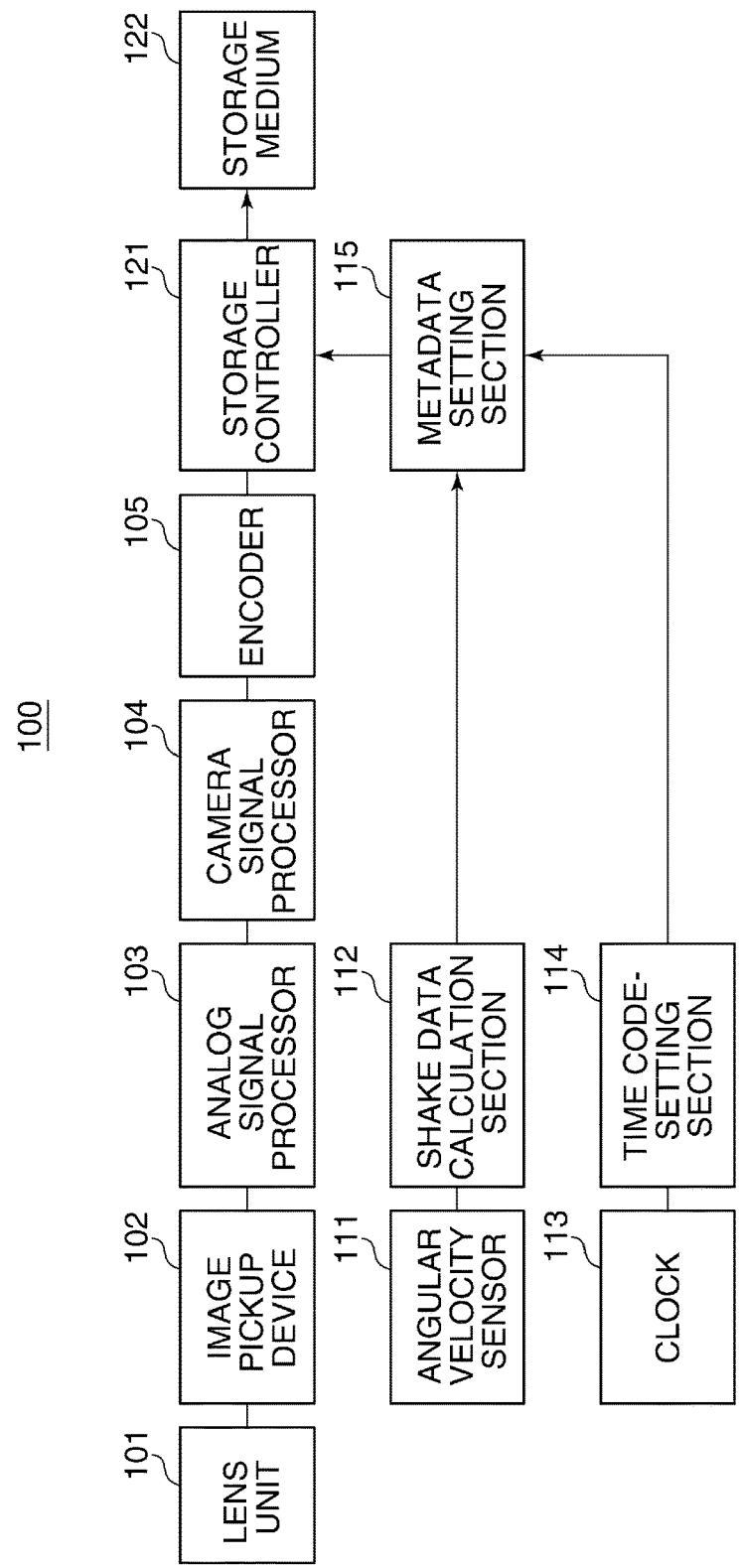
FIG. 1 is a control block diagram of component elements of a digital video camera as a video reproduction apparatus according to an embodiment of the present invention, which perform processing from shooting to storing of video.

FIG. 1 is a control block diagram of component elements of a digital video camera (hereinafter referred to as the "video camera") 100 as a video reproduction apparatus (moving image reproduction apparatus) according to an embodiment of the present invention, which perform processing from shooting to storing of video (moving image). The video camera 100 includes a lens unit 101, an image pickup device 102, an analog signal processor 103, a camera signal processor 104, and an encoder 105. Further, the video camera 100 includes an angular velocity sensor 111, a shake data calculation section 112, a clock 113, a time code-setting section 114, a metadata setting section 115, a storage controller 121, and a storage medium 122.

The lens unit 101 causes an object image to be formed on the image pickup device 102. The image pickup device 102, which is implemented e.g. by a CCD sensor or a CMOS sensor, photoelectrically converts an object image formed thereon to output analog signals. The analog signal processor 103 performs predetermined processing on the analog signals output from the image pickup device 102 to generate analog image signals. The analog signal processor 103 includes e.g. a CDS (correlated double sampling) circuit, an AGC (automatic gain control) circuit, and so forth. The camera signal processor 104 includes an analog-to-digital converter, and generates digital video signals from the analog image signals generated by the analog signal processor 103. The encoder 105 encodes the digital video signals generated by the camera signal processor 104 in MPEG2 (Moving Picture Experts Group 2) format to output a stream in the MPEG2 format.

The angular velocity sensor 111 detects the angular velocity of shake applied to the video camera 100. The shake data calculation section 112 calculates a shake amount of the video camera 100 based on an output from the angular velocity sensor 111 to output shake data including the calculated shake amount to the metadata setting section 115. The time code-setting section 114 sets a time code at the time of storing video, based on time information acquired from the clock 113. The metadata setting section 115 outputs the shake data, the time code, camera-related data (not shown), and so forth, as metadata. The storage controller 121 stores the stream (video data) in the MPEG2 format from the encoder 105 in a state in which the metadata from the metadata setting section 115 is added thereto, in the storage medium 122.

Figure 2:
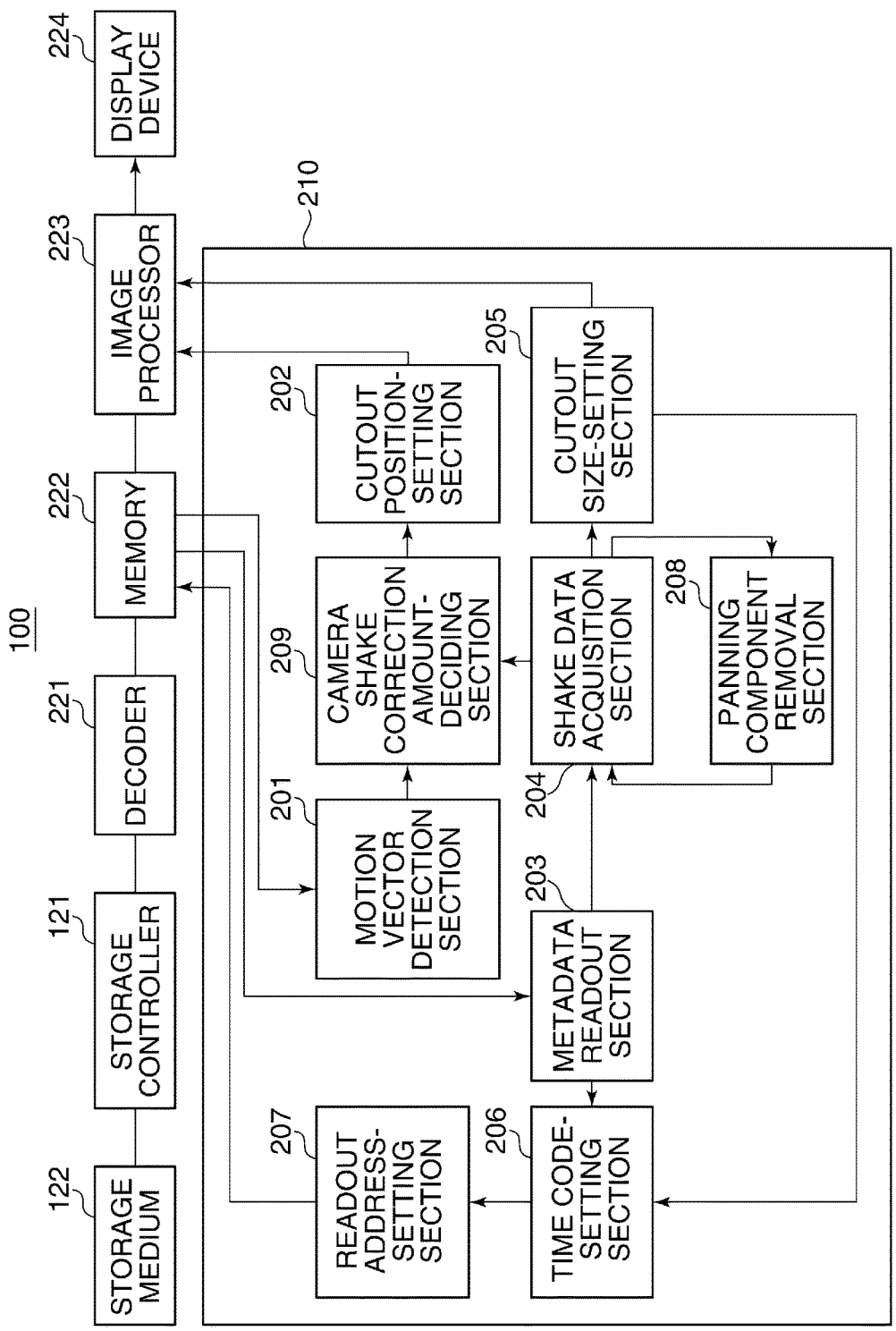
FIG. 2 is a control block diagram of component elements of the digital video camera, which perform reproduction processing of stored video.

FIG. 2 is a control block diagram of component elements of the video camera 100, which perform reproduction processing of video (captured moving image) stored in the storage medium 122. The storage controller 121 and the storage medium 122 are component elements involved in the processing from shooting to storing of video, and also involved in the reproduction processing of the stored video. The video camera 100 further includes a microcomputer 210 (hereinafter referred to as the "MPU 210"), a decoder 221, a memory 222, an image processor 223, and a display device 224.

As mentioned above, the storage medium 122 stores the video data having the metadata including the shake data added thereto. Note that the format for storing metadata and video data is not limited, but any suitable format may be used insofar as it is capable of storing shake data and video data acquired by the video camera 100. For example, metadata may be stored separately from video data. The storage controller 121 acquire the video data and the metadata (shake data) from the storage medium 122. The decoder 221 decodes the video data (stream in the MPEG2 format) acquired by the storage controller 121 into digital video signals to output the digital video signals to the memory 222 together with the metadata.

The memory 222 stores e.g. a several-second length of the decoded digital video signals. By storing the several-second length of the digital video signals in the memory 222, it is possible to obtain information preceding in time a reproduced image (unit image being reproduced) which is being output to the display device 224. The image processor 223 reproduces the video data according to a cutout position and a cutout size determined by the MPU 210. More specifically, the image processor 223 sequentially cuts out, from a plurality of unit images (field images or frame images) which form the video represented by the video data, respective images each having a predetermined cutout size and cut out from a predetermined cutout position. Then, the image processor 223 subjects each cut-out image to electronic zoom to output the resulting image to the display device 224. The display device 224 displays the video by sequentially displaying the images acquired from the image processor 223.

The MPU 210 controls the overall operation of the video camera 100. Note that although not shown in FIG. 1, the MPU 210 not only controls the reproduction processing of video but also controls the processing from shooting to storing of video by the video camera 100. The MPU 210 includes a motion vector detection section 201, a cutout position-setting section 202, a metadata readout section 203, a shake data acquisition section 204, and a cutout size-setting section 205. Further, the MPU 210 includes a time code-setting section 206, a readout address-setting section 207, a panning component removal section 208, and a camera shake correction amount-deciding section 209. Note that FIG. 2 shows only essential components of the MPU 210 for performing camera shake correction, and the functions of the MPU 210 are not limited to the functions of the above-described sections.

The motion vector detection section 201 detects a motion vector from digital images stored in the memory 222. The motion vector detected by the motion vector detection section 201 plays the role of an index of camera shake in video, and is output to the camera shake correction amount-deciding section 209. The metadata readout section 203 reads out metadata from a readout address of the memory 222 set by the readout address-setting section 207. The shake data acquisition section 204 acquires shake data from the metadata acquired by the metadata readout section 203 to output the shake data to the camera shake correction amount-deciding section 209. The time code-setting section 206 acquires a time code of a current reproduced image (unit image being reproduced) from the metadata readout section 203, and notifies the readout address-setting section 207 of a time code indicative of a time a predetermined time period after the acquired time code.

The readout address-setting section 207 sets an address corresponding to the time code notified from the time code-setting section 206 as a readout address of the memory 222. This makes it possible for the metadata readout section 203 to acquire metadata of an image (unit image) to be reproduced at a time the predetermined time period after the reproduction of the current image.

The panning component removal section 208 performs filtering for removing low-frequency components from the shake data acquired from the shake data acquisition section 204 (to remove a panning component from the shake data), and returns the shake data having the panning component removed therefrom to the shake data acquisition section 204. The cutout size-setting section 205 determines a cutout size of the unit image based on the shake data acquired by the shake data acquisition section 204, and notifies the cutout size to the image processor 223. The camera shake correction amount-deciding section 209 determines a camera shake correction amount based on the output from the motion vector detection section 201 and the output from the shake data acquisition section 204. The cutout position-setting section 202 determines (moves), based on the camera shake correction amount decided by the camera shake correction amount-deciding section 209, the cutout position of the unit image such that camera shake in video is corrected, and notifies the resulting cutout position to the image processor 223.

Figure 3:
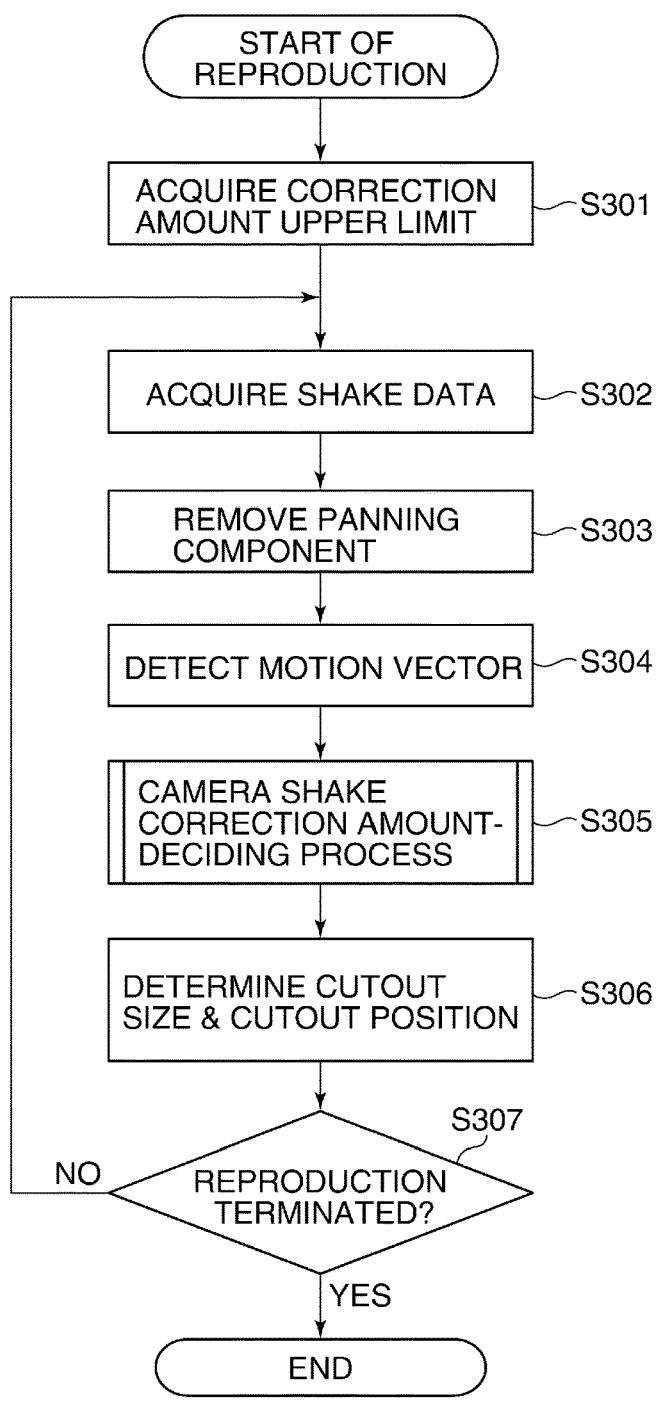
FIG. 3 is a flowchart of a video data reproduction process performed by the digital video camera.

FIG. 3 is a flowchart of a video data reproduction process performed by the video camera 100. The video data reproduction process shown in FIG. 3 is realized by the MPU 210 executing a predetermined program for reproducing and displaying video data and the sections of the MPU 210 cooperating with each other to control the operations of the sections of the video camera 100.

Referring to FIG. 3, in a step S301, before the storage controller 121 reads out first frame data of reproduction target video from the storage medium 122, the shake data acquisition section 204 acquires a correction amount upper limit for correcting camera shake in video via the metadata readout section 203. The correction amount upper limit is an upper limit value of a correction amount range within which camera shake in video can be corrected. Here, it is assumed that a predetermined value is set in advance as the upper limit value. In a step S302, the shake data acquisition section 204 acquires shake data in an amount corresponding to a predetermined time period (a predetermined number of frames) from a start point of reproduction of the video data, via the metadata readout section 203.

In a step S303, the panning component removal section 208 acquires the shake data from the shake data acquisition section 204, and performs filtering for removing low-frequency components (panning component) from the acquired shake data. Thus, movement of an object caused by the panning of the video camera 100 is removed from the camera shake to be corrected. In a step S304, the motion vector detection section 201 divides the video data into a grid (lattice), and detects a motion vector from data indicative of inter-frame correlations, for each rectangle area of the grid. In a step S305, the camera shake correction amount-deciding section 209 performs a camera shake correction amount-deciding process, described hereinafter with reference to FIG. 6, to decide a camera shake correction amount for use in video reproduction, based on the shake data having the panning component removed therefrom and the motion vector detected in the step S304.

In a step S306, the cutout size-setting section 205 checks the amplitude of the camera shake represented by the shake data having the panning component removed therefrom in the step S303, and determines a cutout size of an image in each frame such that a change in the cutout size is within a predetermined range. Further, the cutout position-setting section 202 determines (moves) the cutout position such that camera shake in video is corrected, based on the camera shake correction amount determined in the step S305, and sets the cutout position in the image processor 223. The determination of the cutout position can be performed using a desired known technique, and hence detailed description thereof is omitted. When the cutout size and the cutout position are set in the step S306, the image processor 223 cuts out an image having the cutout size set in the step S306 from the set cutout position of the unit image, and outputs the cut-out image to the display device 224.

In a step S307, the MPU 210 determines whether or not the reproduction of the video has been terminated (the video has been reproduced to the last frame). If it is determined that the reproduction of the video has not been terminated (NO to the step S307), the MPU 210 returns to the step S302, whereas if it is determined that the reproduction of the video has been terminated (YES to the step S307), the MPU 210 terminates the present process.

Next, a description will be given of a method of deciding the camera shake correction amount by the camera shake correction amount-deciding process in the step S305. To decide the camera shake correction amount, the correction amount upper limit as the upper limit of the correction amount range within which camera shake in video can be corrected and an actual shake amount associated with the frame number of a frame currently being reproduced (hereinafter referred to as the "reference shake amount") are used. In a case where the reference shake amount exceeds the correction amount upper limit, interpolation processing is performed to determine an interpolated shake amount, and the determined interpolated shake amount is decided as the camera shake correction amount. On the other hand, in a case where the reference shake amount is not larger than the correction amount upper limit, the reference shake amount is directly decided as the camera shake correction amount.

Figure 4A:
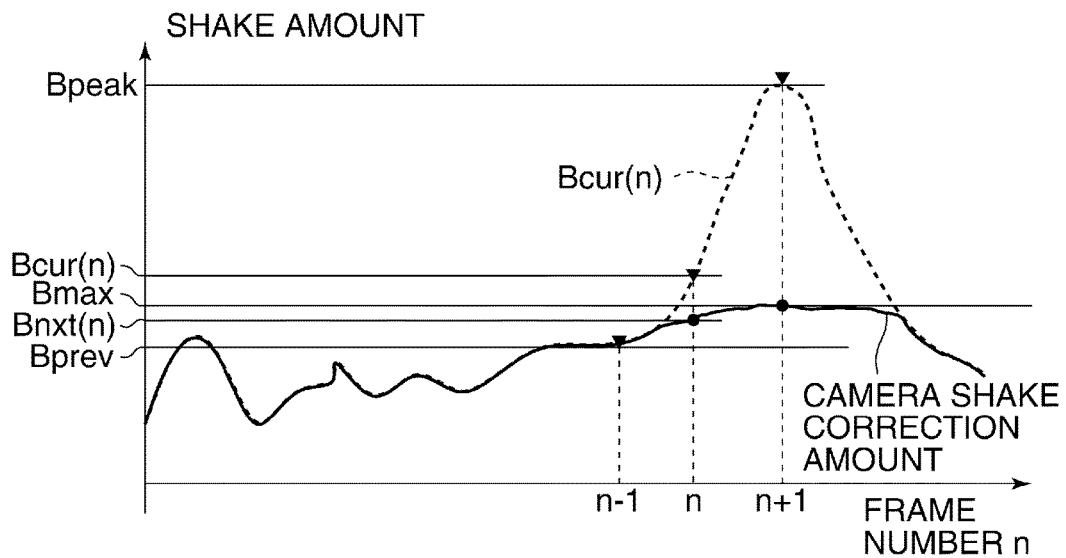
FIG. 4A is a diagram showing changes with time in a reference shake amount and an interpolated shake amount, on a frame basis.
Figure 4B:
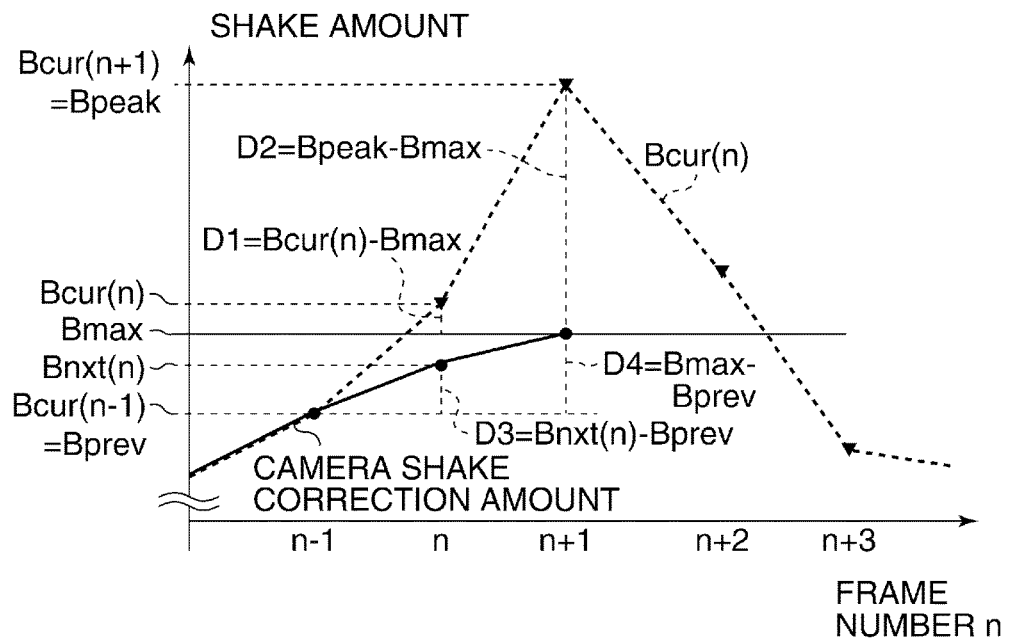
FIG. 4B is a partial enlarged view of FIG. 4A.
Figure 5B:
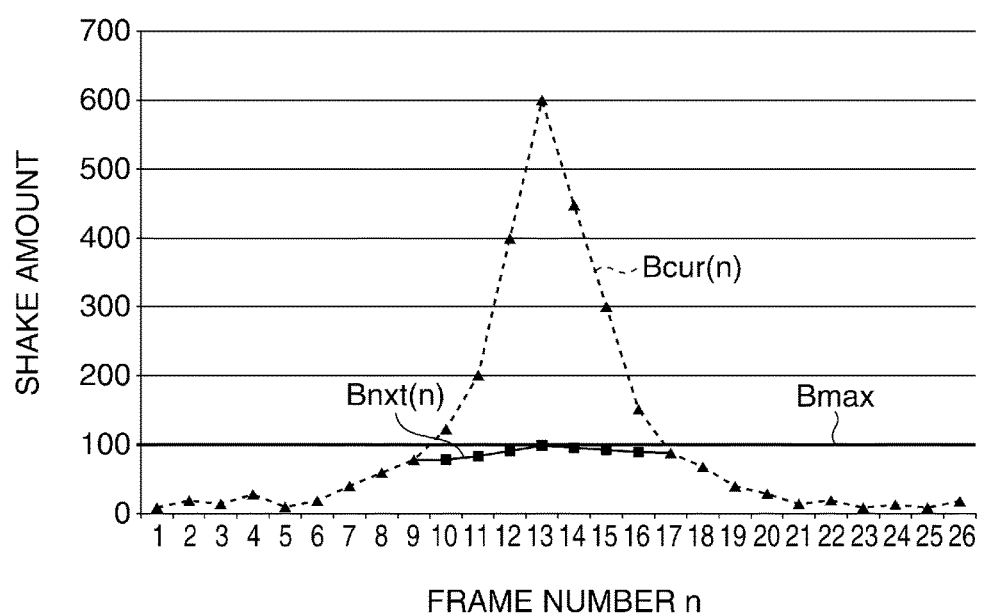
FIG. 5B is a graph formed from the table shown in FIG. 5A.

FIG. 4A is a diagram showing an example of changes with time in the reference shake amount Bcur(n) and the interpolated shake amount Bnxt(n), on a frame basis. FIG. 4B is a partial enlarged view of FIG. 4A. FIG. 5A is a diagram showing a table indicating a relationship between the reference shake amount Bcur(n) and the interpolated shake amount Bnxt(n). FIG. 5B is a graph formed from the table shown in FIG. 5A. In FIG. 5B, the reference shake amount Bcur(n) is indicated by a broken line, and the interpolated shake amount Bnxt(n) is indicated by a solid line.

The correction amount upper limit Bmax is set in advance to a predetermined value, and in the present embodiment, it is assumed to be set to "100". In a range not larger than the correction amount upper limit Bmax, the reference shake amount Bcur(n) is decided as the camera shake correction amount.

On the other hand, in a case where the reference shake amount Bcur(n) is larger than the correction amount upper limit Bmax, the interpolated shake amount Bnxt(n) is determined from reference shake amounts Bcur(n±3), and the determined interpolated shake amount Bnxt(n) is used as the camera shake correction amount. Although detailed description will be given hereinafter, in the present embodiment, a current frame number is represented by n, and the interpolated shake amount Bnxt(n) is determined by performing interpolation processing using the reference shake amounts Bcur(n±3) of each three frames preceding and following the frame having the current frame number n. Note that the reference shake amounts Bcur(n±3) represent six reference shake amounts Bcur(n−3), Bcur(n−2), Bcur(n−1), Bcur(n+1), Bcur(n+2), and Bcur(n+3).

Note that to calculate the interpolated shake amount Bnxt(n), it is not necessarily required to use the reference shake amounts Bcur(n±3) of each three preceding and following frames, but it is possible to determine the number of preceding and following frames by taking into account interpolation accuracy and computation load. For example, by acquiring at least three reference shake amounts, i.e. a reference shake amount of an n-th frame, and reference shake amounts of n−1-th and n+1-th frames respectively preceding and following the n-th frame, it is possible to calculate the reference shake amount of the n-th frame by interpolation. Further, the number of acquired reference shake amounts of preceding frames and the number of acquired reference shake amounts of following frames with reference to the frame having the frame number n may be different. In short, by performing interpolation processing using reference shake amounts Bcur(n±1) of each at least one frame preceding and following the frame having the frame number n, it is possible to determine the interpolated shake amount Bnxt(n).

Figure 6:
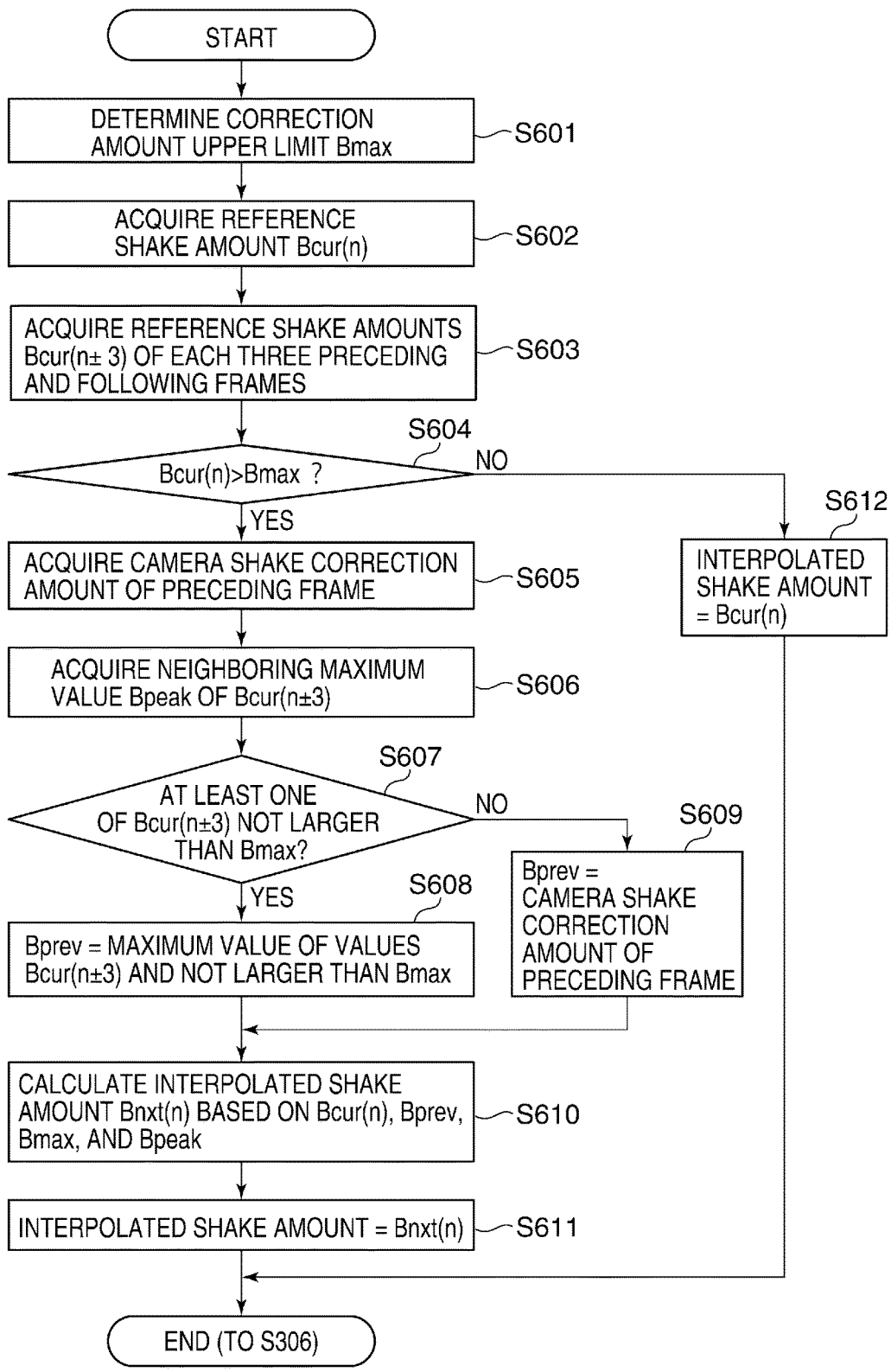
FIG. 6 is a flowchart of a camera shake correction amount-deciding process executed in a step in the video data reproduction process in FIG. 3.

FIG. 6 is a flowchart of the camera shake correction amount-deciding process executed in the step S305. Next, the camera shake correction amount-deciding process will be described, by referring to FIGS. 4A to 5B, as required. In a step S601, the camera shake correction amount-deciding section 209 determines the correction amount upper limit Bmax. The correction amount upper limit Bmax can be determined by a known technique, and hence description of a method of determining the same is omitted. In a step S602, the camera shake correction amount-deciding section 209 acquires the reference shake amount Bcur(n) corresponding to the current frame number n, from the shake data and the motion vector. In a step S603, the camera shake correction amount-deciding section 209 acquires the reference shake amounts Bcur(n±3) of the each three frames preceding and following the frame having the current frame number n. In a step S604, the camera shake correction amount-deciding section 209 determines whether or not the reference shake amount Bcur(n) is larger than the correction amount upper limit Bmax.

If it is determined that the reference shake amount Bcur(n) is not larger than the correction amount upper limit Bmax (NO to the step S604), the camera shake correction amount-deciding section 209 proceeds to a step S612. In the step S612, the camera shake correction amount-deciding section 209 sets the reference shake amount Bcur(n) as the camera shake correction amount of the frame having the current frame number n. After the camera shake correction amount is set in the step S612, the camera shake correction amount-deciding section 209 terminates the present process, followed by executing the step S306 of the video data reproduction process in FIG. 3.

If it is determined in the step S604 that the reference shake amount Bcur(n) is larger than the correction amount upper limit Bmax (YES to the step S604), the camera shake correction amount-deciding section 209 proceeds to a step S605. In the step S605, the camera shake correction amount-deciding section 209 acquires a camera shake correction amount of the preceding frame having the frame number (n−1). The camera shake correction amount acquired in the step S605 is either the Bcur(n−1) or the Bnxt (n−1). In a step S606, the camera shake correction amount-deciding section 209 acquires the maximum value of the reference shake amounts Bcur(n±3) (hereinafter referred to as the "neighboring maximum value Bpeak"). In the example illustrated in FIGS. 4A and 4B, the reference shake amount Bcur(n+1) is acquired as the neighboring maximum value Bpeak.

In a step S607, the camera shake correction amount-deciding section 209 determines whether or not at least one value of the reference shake amounts Bcur(n±3) is not larger than the correction amount upper limit Bmax. If it is determined that at least one value of the reference shake amounts Bcur(n±3) is not larger than the correction amount upper limit Bmax (YES to the step S607), the camera shake correction amount-deciding section 209 proceeds to a step S608. In the step S608, the camera shake correction amount-deciding section 209 sets one of the reference shake amounts Bcur(n±3), which is not larger than the correction amount upper limit Bmax and also is the maximum value of the reference shake amounts, as the latest shake amount Bprev. On the other hand, if it is determined that all of the reference shake amounts Bcur(n±3) are larger than the correction amount upper limit Bmax (NO to the step S607), the camera shake correction amount-deciding section 209 proceeds to a step S609. In the step S609, the camera shake correction amount-deciding section 209 sets the camera shake correction amount of the preceding frame having the frame number (n−1) as the latest shake amount Bprev. In a step S610, the camera shake correction amount-deciding section 209 determines the interpolated shake amount Bnxt(n) from the reference shake amount Bcur(n), the correction amount upper limit Bmax, the neighboring maximum value Bpeak, and the latest shake amount Bprev, using a linear function.

Here, a description will be given of a method of determining the interpolated shake amount Bnxt(n) with reference to FIG. 4B. Referring to FIG. 4B, the reference shake amounts Bcur(n) and Bcur(n+1) are both larger than the correction amount upper limit Bmax, and hence the interpolated shake amounts Bnxt(n) and Bnxt(n+1) are calculated. Further, the reference shake amount Bcur(n+1) is the neighboring maximum value Bpeak. Differences D1 and D2 between the correction amount upper limit Bmax, and the reference shake amounts Bcur(n) and Bcur(n+1) of the frames having the respective frame numbers n and n+1 are determined by respective equations (1) and (2), described below. Differences D3 and D4 between the latest shake amount Bprev, and the interpolated shake amounts Bnxt(n) and Bnxt(n+1) of the frames having the respective frame numbers n and n+1 are determined by respective equations (3) and (4), described below. Assuming that the difference D1 and the difference D2, and the difference D3 and the difference D4 are in proportional relationship with each other, respectively, an equation (5), described below, holds, and the interpolated shake amount Bnxt(n) can be determined by an equation (6), described below, which is changed from the equation (5).

$$D1 = Bcur(n) - Bmax \quad (1)$$

$$D2 = Bcur(n+1) - Bmax = Bpeak - Bmax \quad (2)$$

$$D3 = Bnxt(n) - Bcur(n-1) = Bnxt(n) - Bprev \quad (3)$$

$$D4 = Bnxt(n+1) - Bcur(n-1) = Bmax - Bprev \quad (4)$$

$$(Bcur(n) - Bmax):(Bpeak - Bmax) = (Bnxt(n) - Bprev): (Bmax - Bprev) \quad (5)$$

$$Bnxt(n) = \{[(Bcur(n) - Bmax) \times (Bmax - Bprev)]/(Bpeak - Bmax)\} + Pprev \quad (6)$$

In a step S611, the camera shake correction amount-deciding section 209 sets the interpolated shake amount Bnxt(n) calculated in the step S611 as the camera shake correction amount of the frame having the frame number n. When the camera shake correction amount is set in the step S611, the camera shake correction amount-deciding section 209 terminates the present process, followed by executing the step S306 of the video data reproduction process in FIG. 3. That is, the camera shake correction amount is decided in one of the steps S611 and S612, and the step S306 is executed using the decided camera shake correction amount. Note that although the description has been given of the case where the shake amounts assume positive values, with reference to FIGS. 4A to 6, there is a case where the shake amounts assume negative values. In such a case, positive and negative signs are only reversed from the case where the shake amounts assume positive values, so that the camera shake correction amount can be determined by the same method as employed in the case of the shake amounts assuming positive values.

According to the above-described embodiment, in the camera shake correction process performed during reproduction of video, even in a case where the video includes a scene in which a large camera shake exceeding the correction amount upper limit (correctable range) has occurred, the camera shake correction process is performed without excessive enlargement of the video. In this case, a camera shake correction amount of a frame of which the actual shake amount (reference shake amount) exceeds the correction amount upper limit is determined by interpolation processing performed by taking into account shake amounts of neighboring frames. This makes it possible to progressively reduce effects of camera shake correction starting from the vicinity of the correction amount upper limit, instead of suddenly eliminating the effects of camera shake correction after the correction amount upper limit is reached. Therefore, it is possible to suppress occurrence of an unnatural camera shake in video during video reproduction, thereby making it difficult for a user to feel a strangeness.

Note that the above description is given of the method of performing camera shake correction by comparing the reference shake amount Bcur(n) with the correction amount upper limit Bmax, and deciding the interpolated shake amount Bnxt(n) as the camera shake correction amount in a case where the reference shake amount Bcur(n) is larger than the correction amount upper limit Bmax. However, the method of determining the camera shake correction amount by taking the correction amount upper limit Bmax into account is by no means limited to the method described above, but any other suitable method may be employed. Further, in the above-described embodiment, the interpolated shake amount Bnxt(n) is calculated from the reference shake amounts of each three frames preceding and following the current frame, by subjecting the reference shake amount Bcur(n) to interpolation using a linear function. However, the method of subjecting the reference shake amount Bcur(n) that exceeds the correction amount upper limit Bmax to interpolation is not limited to this, but any other suitable method may be employed. Furthermore, although in the above-described embodiment, the correction amount upper limit Bmax is determined before video reproduction, the correction amount upper limit Bmax may be determined by any other suitable method. For example, the maximum shake amount and the average shake amounts of the whole video may be detected in advance and the correction amount upper limit Bmax may be changed according to results of the detection on a video-by-video basis. Alternatively, the correction amount upper limit Bmax may be manually set before reproduction of the video.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although in the above-described embodiment, a video camera is described as the video reproduction apparatus, this is not limitative, but the present invention can also be applied to an electronic apparatus, such as a personal computer or a smartphone, which has a function of reproducing video. Further, although in the above-described embodiment, the description has been given of a case where video is reproduced which is stored in the storage medium 122 mounted on the video camera 100, video data of video to be reproduced may be acquired via a network.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

This application claims the benefit of Japanese Patent Application No. 2017-080708 filed Apr. 14, 2017 which is hereby incorporated by reference herein in its entirety.

What is claimed is:

1. A moving image reproduction apparatus that reproduces and displays captured moving image on a display device, comprising at least one processor that executes a program stored in a memory to function as:
   an acquisition unit configured to acquire a shake amount associated with the captured moving image;
   a determination unit configured to determine whether or not the shake amount exceeds a range within which camera shake in the captured moving image can be corrected;
   a calculation unit configured to, in a case where the shake amount exceeds the range, calculate an interpolated shake amount based on the shake amount such that the interpolated shake amount is within the range;
   a decision unit configured to decide a camera shake correction amount for correcting the camera shake in the captured moving image based on the shake amount and the interpolated shake amount; and
   a correction unit configured to correct the camera shake in the captured moving image using the camera shake correction amount,
   wherein in a case where the shake amount does not exceed the range, the decision unit decides the shake amount as the camera shake correction amount, whereas in the case where the shake amount exceeds the range, the decision unit decides the interpolated shake amount as the camera shake correction amount.

2. The moving image reproduction apparatus according to claim 1, wherein the moving image is formed by a plurality of frames, and
   wherein the acquisition unit acquires the shake amount on a frame-by-frame basis.

3. The moving image reproduction apparatus according to claim 2, wherein in a case where a shake amount of a predetermined frame of the plurality of frames exceeds the range, the calculation unit calculates the interpolated shake amount by calculating the shake amount of the predetermined frame by interpolation using shake amounts of frames preceding and following the predetermined frame.

4. The moving image reproduction apparatus according to claim 2, wherein the correction unit includes a setting unit configured to set a cutout position of an image on a frame-by-frame basis such that the camera shake in the captured moving image is corrected based on the camera shake correction amount decided by the decision unit.

5. The moving image reproduction apparatus according to claim 1, further comprising a removal unit configured to remove low-frequency components from the shake amount acquired by the acquisition unit, and
   wherein the acquisition unit outputs the shake amount having the low-frequency components removed therefrom by the removal unit to the calculation unit.

6. A method of controlling a moving image reproduction apparatus that reproduces and displays captured moving image on a display device, comprising:
   acquiring a shake amount associated with the captured moving image;
   determining whether or not the shake amount exceeds a range within which camera shake in the captured moving image can be corrected;
   calculating, in a case where the shake amount exceeds the range, an interpolated shake amount based on the shake amount such that the interpolated shake amount is within the range;
   deciding a camera shake correction amount for correcting the camera shake in the captured moving image based on the shake amount and the interpolated shake amount; and
   correcting the camera shake in the captured moving image using the camera shake correction amount,
   wherein said deciding includes deciding, in a case where the shake amount does not exceed the range, the shake amount as the camera shake correction amount, and deciding, in the case where the shake amount exceeds the range, the interpolated shake amount as the camera shake correction amount.

7. A non-transitory computer-readable storage medium storing a computer-executable program for executing a method of controlling a moving image reproduction apparatus that reproduces and displays captured moving image on a display device,
   wherein the method comprises:
   acquiring a shake amount associated with the captured moving image;
   determining whether or not the shake amount exceeds a range within which camera shake in the captured moving image can be corrected;
   calculating, in a case where the shake amount exceeds the range, an interpolated shake amount based on the shake amount such that the interpolated shake amount is within the range;
   deciding a camera shake correction amount for correcting the camera shake in the captured moving image based on the shake amount and the interpolated shake amount; and
   correcting the camera shake in the captured moving image using the camera shake correction amount,
   wherein said deciding includes deciding, in a case where the shake amount does not exceed the range, the shake amount as the camera shake correction amount, and deciding, in the case where the shake amount exceeds the range, the interpolated shake amount as the camera shake correction amount.

* * * * *